(12) United States Patent
Dezonno

(10) Patent No.: US 6,744,879 B1
(45) Date of Patent: Jun. 1, 2004

(54) PROFIT-BASED METHOD OF ASSIGNING CALLS IN A TRANSACTION PROCESSING SYSTEM

(75) Inventor: Anthony J. Dezonno, Bloomingdale, IL (US)

(73) Assignee: Rockwell Electronic Commerce Corp., Wood Dale, IL (US)

( * ) Notice: Subject to any disclaimer, the term of this patent is extended or adjusted under 35 U.S.C. 154(b) by 0 days.

(21) Appl. No.: 09/496,639

(22) Filed: Feb. 2, 2000

(51) Int. Cl.[7] .............................. H04M 3/00; H04M 5/00
(52) U.S. Cl. .............................. 379/265.05; 379/266.02
(58) Field of Search .................. 379/265.02, 265.05, 379/265.06, 265.13, 266.01, 266.02, 266.06, 266.1, 309; 705/14, 7; 703/13

(56) References Cited

U.S. PATENT DOCUMENTS

| | | | | |
|---|---|---|---|---|
| 5,291,550 A | | 3/1994 | Levy et al. ................. | 379/242 |
| 6,088,444 A | * | 7/2000 | Walker et al. ......... | 379/266.02 |
| 6,163,607 A | * | 12/2000 | Bogart et al. .......... | 379/266.01 |
| 6,173,053 B1 | * | 1/2001 | Bogart et al. .......... | 379/266.01 |
| 6,389,400 B1 | * | 5/2002 | Bushey et al. ................. | 705/7 |
| 6,405,159 B2 | * | 6/2002 | Bushey et al. ................ | 703/13 |
| 2001/0011228 A1 | * | 8/2001 | Shenkman ................... | 705/14 |
| 2002/0067822 A1 | * | 6/2002 | Cohen et al. .......... | 379/265.12 |

FOREIGN PATENT DOCUMENTS

| | | |
|---|---|---|
| EP | 0949793 A1 | 7/1998 |
| EP | 0855826 A2 | 10/1999 |

* cited by examiner

Primary Examiner—Benny Tieu
(74) Attorney, Agent, or Firm—Welsh & Katz, Ltd.

(57) ABSTRACT

A method and apparatus are provided for processing calls in a transaction processing system using a plurality of transaction processing entities. The method includes the steps of determining an average profit generated by each entity of the plurality of entities for previously processed calls and assigning an entity of the plurality of entities with a highest relative profit to each new processed call.

40 Claims, 1 Drawing Sheet

PROFIT-BASED METHOD OF ASSIGNING CALLS IN A TRANSACTION PROCESSING SYSTEM

FIELD OF THE INVENTION

The field of the invention relates to telephonic communication systems and more particularly to automatic call distributors.

BACKGROUND OF THE INVENTION

Automatic call distribution systems are known. Such systems are typically used in an organizational context as a means of distributing telephone calls among agents of the organization. To improve the consistency and quality of call handling, agents are typically segregated into groups to serve particular call targets of the organization.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are considered equal, the automatic call distributor (ACD) may distribute the calls based upon which agent position (telephone) has been idle the longest.

In other systems, where skill is considered essential for call handling, a call may be directed to an agent (or agent group) considered the most skilled for the call considered. In these systems, agents are often classified according to a skill level. The classified skill level may be based upon any number of predetermined criteria.

Where skill is used in call distribution, skill is typically coupled with knowledge about the call or the caller to improve a call result. For example, dialed number identification service (DNIS) operating from within the PSTN may provide the ACD with a number that was dialed by the caller. Where the operator of the ACD has many different departments (and incoming telephone numbers), a knowledge of the department called may be used to select the agent most familiar with the department called.

Alternatively, an automatic number identification (ANI) feature (also operating from within the PSTN) may provide the ACD with a telephone number of the caller, thereby providing a means of identifying the caller. Where the caller is a prior customer, the telephone number may be used to recover an account history of the caller and the caller's prior buying habits with regard to preferred product areas. A knowledge of the caller's prior buying habits may allow the ACD to select an agent with the best skills in those product areas.

Alternatively, a prefix on the caller's telephone number may be used to identify a location of the caller. By knowing the buying tendencies of a particular local (or a local language requirement), the ACD may select an agent skilled in the needs of the caller.

While skill based routing has provided an improvement over routing based upon idle time, it still has certain deficiencies. For example, the rating of an agent's skill according to a set of predetermined criteria is often a highly subjective process, which often fails to adequately reflect an agent's value to an organization. Accordingly, a need exists for improved methods of call routing which does not rely upon an arbitrary skill rating criteria.

SUMMARY

A method and apparatus are provided for processing calls in a transaction processing system using a plurality of transaction processing entities. The method includes the steps of determining an average profit generated by each transaction processing entity of the plurality of transaction processing entities for previously processed calls and assigning a transaction processing entity of the plurality of transaction processing entities with a highest relative profit to each new processed call.

DETAILED DESCRIPTION OF A PREFERRED EMBODIMENT

Figure 1:
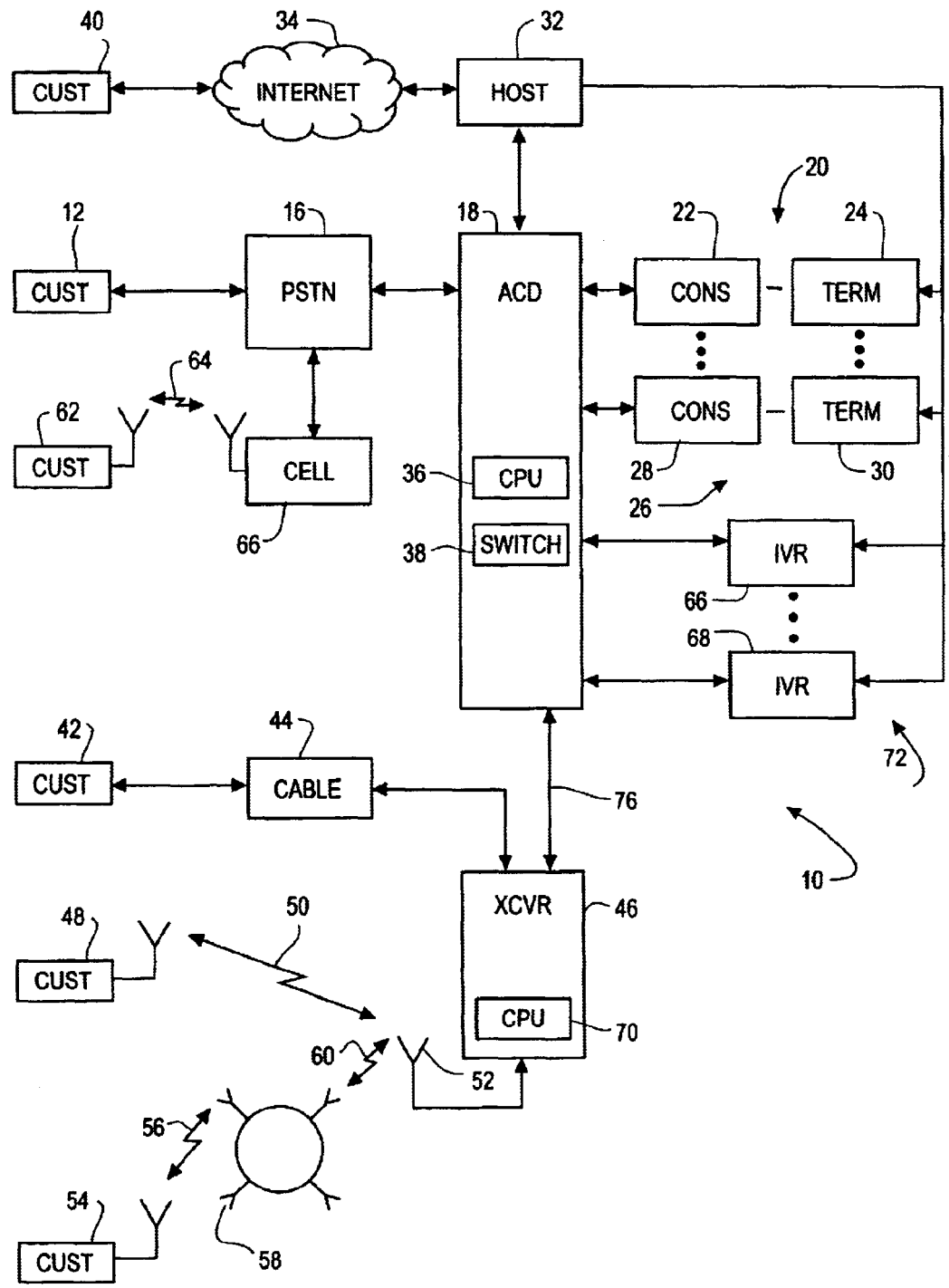
FIG. 1 is a block diagram of a transaction processing system in accordance with an illustrated embodiment of the invention.

FIG. 1 depicts a transaction processing system 10 in accordance with an illustrated embodiment of the invention. Such a system 10 may be used to route calls from any of a number of sources (e.g., through the PSTN, Internet, e-mail, cellular telephone system, cable TV system, radio, satellite, etc.). As used herein, a call may be based on a switched circuit connection (i.e., through the PSTN) or a packet connection (e.g., through the Internet). A switched circuit connection (also sometimes referred to simply as a "telephone connection" in the telephony arts) refers to a dedicated channel existing between two parties. As used herein, a packet connection does not represent a physical connection, but simply the possession and concurrent use by two users of the other user's IP address.

Under the illustrated embodiment, calls may be received from customers 12, 40, 42, 48, 54, 62 and be routed to a selected transaction processing entity 72 (e.g., agent stations 20, 26 or interactive voice response units (IVRs) 66, 68) by the transaction processing system 10.

For example, each agent station 20, 26 may include a telephone console 22, 28 and a terminal 24, 30. Switched circuit calls with customers 12, 42, 48, 54, 62 placed through the ACD 18, may be routed by matrix switch 38 of the ACD 18 to a console 22, 28 of the agent 20, 26 or to an appropriate IVR 66, 68.

Calls through the Internet 34 may occur as e-mail or as voice over IP (VOIP). In either case, the host 32 may route the call to a terminal 24, 30 of an agent 20, 26.

A customer 12, 40 may use a conventional telephone or cell phone and/or a computer to place/receive a call with the transaction processing system. Alternatively, the customer 42, 48, 54 may place/receive a call using an interactive channel of a community antenna television (CATV) system 44, land mobile radio 50 or a transmission channel 56, 60 of a satellite 58. Where the customer 42, 48, 54 places a call using an interactive channel of a community antenna television (CATV) system 44, land mobile radio 50 or a transmission channel 56, 60 of a satellite 58, it may be assumed that such call is initiated by the entry of a target identifier (e.g., a telephone number of the ACD 18) using a conventional touch-tone pad.

For simplicity, reference to an agent herein shall be to the agent station 20, 26 without regard to the device 22, 24, 28, 30 actually used by the agent. Similarly, reference to a customer herein shall be to a station 12, 40, 42, 48, 54, 62 of the customer without regard to the device actually used.

While the term "caller" may herein sometimes by used to refer to the customer 12, 40, 42, 48, 54, 62, it should be understood that calls may just as well be initiated by the transaction processing system 10. For example, customer lists may be maintained in a database of the host 32. Outgoing calls from the system 10 may be initiated to the customers 12, 40, 42, 48, 54, 62 by the CPU 36 through the PSTN 16, radio frequency (rf) transceiver 46 or by the host 32 through the Internet 34.

Associated with each customer 12, 40, 42, 48, 54, 62 may be an identifier and call routing information. The identifier may be an identifier used for identifying the customer 12, 40, 42, 48, 54, 62 within a particular communication system (e.g., a telephone number within the PSTN 16, an IP address within the Internet 34, a customer account number within the CATV system 44, an electronic serial number (ESN) within the land mobile radio 50 or satellite system 58, etc.).

The routing information may be used to identify the particular system (e.g., PSTN 16, Internet 34, CATV 44, land mobile radio 50, satellite 58, etc.) within which the identifier is to be used. In the case of the transaction processing system 10, the routing information may simply identify the port through which the call is to be processed. For example, a port for an Internet call may be an Internet connection with the host 32. A telephone call may be processed through a first set of trunk connections 74 using a respective port of a switch 38 of the ACD 18. A call with a cable subscriber 42, land mobile user 48 or satellite customer 54 may be processed through a second set of trunk connections 76 using a respective port of the switch 38 of the ACD 18. The identifier and call routing information may, together, be referred to herein as call associated information.

Whether a call is incoming or outgoing, the distribution of the call may be substantially the same and may be based upon a call classification system. When the call is outgoing, the transaction processing system 10 inherently knows the identity of the call target. When the call is incoming, the transaction processing system 10 may determine the identity of the caller based upon the call associated information (e.g., a port number and ANI or IP address information in the case of the PSTN or Internet). By knowing the identity of a customer 12, 14, the transaction processing system 10 may classify the call based upon the historical needs of the customer 12, 40, 42, 48, 54, 62 or some other well-known criteria.

Blind incoming calls, on the other hand, may be classified based upon DNIS numbers of a PSTN caller or the IP address of a website visitor or e-mail query. Cable, land mobile or satellite callers may be classified based upon a geographical location of the transceiver 46 processing the call and local mass media promotions. The bi-directional nature of transaction processing of calls herein may be reflected by using the phase "calls with customers 12, 40, 42, 48, 54, 62".

Calls with customers 12, 40, 42, 48, 54, 62 may be routed to transaction processing entities (e.g., agents) based upon one of two formats. Under a first format, a call may be detected by the ACD 18 as a switched circuit formed through the PSTN 16. Calls received under the first format are typically delivered along with call associated information (e.g., DNIS, ANI, ESN, switch port number, etc.). Call associated information may be used by a CPU 36 as a means of classifying the call. Calls may be classified based upon any of a number of predetermined criteria (e.g., the number called, the identity of the caller, the local of the caller, the time of day, etc).

Calls with customers 40 under the second format occur through the Internet. As with switched circuit calls, the host 32 would inherently know the identify of outgoing calls. Since the host 32 would know the identity of outgoing calls, the host 32 can easily classify the call based upon customer records.

Incoming calls through the Internet may also be classified by the host 32 based upon call associated information (i.e., the IP address of the caller 40). If the caller 40 is an existing customer, the host 32 can identify the customer in its database using the IP address of the caller as a search term. As above, historical records of the customer may be used as a basis for classifying the call. If the caller 40 is not an existing customer, then the host 32 may classify the caller 40 based upon the context of the call (e.g., an identity of a website visited, a webpage from which a query originates, an identity of the e-mail address within the system 10 which receives a query, etc.).

Because Internet calls and PSTN calls may be distributed to a common set of agents 20, 26 the CPU 36 and host 32 may need to coordinate their efforts in distributing calls. When an Internet call is received, the host 32 may consult an internal list of available agents or retrieve a list of available agents 20, 26 from the CPU 36 of the ACD 18. From that list, the host 32 may select the most qualified agent for assignment to the call. Upon selection of the agent, the host 32 transfers the call to the selected agent 20, 26. When a call is assigned by the host 32, the host 32 sends notification to the CPU 36 of the ACD 18. Notification of a call assignment by the host 32 causes the CPU 36 to remove that agent from its list of available agents.

Similarly, when the CPU 36 assigns a call, the CPU 36 may send notification to the host 32. Using this method, the CPU 36 and host 32 may each maintain a list of available agents 20, 26. From the list of available agents 20, 26, an agent may be selected for each new processed call.

Call delivery to a transaction processing entity 20, 26, 66, 68 may be accomplished under several formats. Where the call is a switched circuit call, the CPU 36 selects an entity and delivers the call to the console 22, 28 of the selected agent or to the selected IVR 66, 68. The CPU 36 may send a call delivery message including the call associated information to the host 32. Where the host 32 is able to identify customer records, the host 32 may present those records to the selected call processing entity 20, 26 at the instant of call delivery (e.g., as a screen pop on a terminal 24, 30 of the selected agent).

Where a call is through the Internet, presentation may be entirely through the terminal 24, 30 of the selected agent. E-mail messages may be forwarded in their entirety to the selected agent. Where the call is in the form of a web telephony call, the host 32 may forward the IP address of the requestor to the selected agent. Where the host 32 is able to identify customer records, those records may be presented to the agent along with the e-mail, web telephony request or Internet query.

Selection of an agent for a call may be made based upon a call classification and a minimum content level (e.g., minimum agent skill level) requirement determined for that classification. Inherently, a voice-based call using a switched circuit connection or web telephony call would have a different minimum skill requirement than an e-mail call because of the verbal abilities required by the voice-based call.

In general, a supervisor working through a supervisors terminal 40 may evaluate a skill of each agent 20, 26. The skill evaluated by the supervisor may be against a number of different criteria. More specifically, the supervisor may enter a skill for each agent 20, 26 with regard to each call classification. For example a first call classification may be with regard to identified customers. The supervisor may evaluate the skill of each agent based upon a knowledge of the technological needs of the customers 12, 40, 42, 48, 54, 62 and upon each agent's skill in dealing with customers 12, 40, 42, 48, 54, 62.

Where a call classification is of a blind call from an unknown customer 12, 40, 42, 48, 54, 62, the supervisor may evaluate the skill of each agent based upon a broad understanding of the ACD owner's products. A skill of each agent with regard to certain languages (e.g., Spanish) may be provided for calls associated with areas with a large Hispanic population.

In addition to evaluating the skills of each agent, the supervisor may also set a minimum skill level for each call type. Further, some call types may include a combination of minimum skill levels.

Based upon a call classification, the host 32 may also assign an IVR 66, 68 to a call. Based upon the call classification, the host 32 may also specify the minimum content requirement for use by the IVR 66, 68 in processing the call. Minimum content requirement, in the content of the IVR 66, 68 may be provided by the IVR application used to service the call.

For example, IVR applications may be written based upon language and subject matter. Calls of a first call classification may be written to provide verbal prompts in a first language which calls of a second classification may be written to provide verbal prompts in a second language.

Further, based upon the caller, an IVR application may present choices based upon a caller's previous buying habits or local mass media promotions. In any case, the caller may be presented with a set of options, which options the caller may select by activation of a button on his touch tone phone. Depending upon the sophistication of the IVR application, information may be collected in anticipation for assignment to an agent 20, 26 or the entire transaction may be completed without human intervention.

In addition to considering a minimum content requirement, the host 32 may also consider a profitability of each transaction processing entity 20, 26, 66, 68 with regard to call classifications.

Profitability may be provided under any of a number of different formats. For example, the supervisor may simply enter a cost for each transaction type for each agent.

Alternatively, profitability may be determined in real time or from call records. Profitability may be determined by determining revenue per call for each entity 20, 26, 66, 68. The revenue may also be determined by dividing the revenue per call by the time period (i.e., the average handling time (AHT)) of the call (e.g., in minutes or seconds) to provide an average revenue per time period. An average transaction cost (e.g., based upon an average salary, a telephone toll charge, etc.) may be subtracted from the determined average revenue to evaluate the feasibility of transferring calls to other transaction processing systems 10 in other locals. Alternatively, the transaction cost could be based not only on toll cost, but also local labor rate, space cost, state and local taxes, overhead assignment, benefits, specific hourly rates, shipping rate etc.

Table I provides a summary of a set of profitability calculations. As shown an entity X may generate an average revenue of $2 per call, with an average handling time of 15 minutes per call. Entity Y may produce a revenue of $5 per call and an average handling time of 20 minutes.

TABLE I

| | REVENUE/CALL | AHT | NORMALIZED REVENUE |
|---|---|---|---|
| Entity X | $2 | 15 minutes | $0.133 |
| Entity Y | $5 | 20 minutes | $0.250 |

Under the illustrated embodiment, an incoming call may first be classified as to the type of call. Once the call has been classified, a minimum content level for the call classification may be retrieved from a database within the host 32. A list of available entities may be evaluated to identify a subgroup of entities (e.g., agents) which meets the minimum content level required by the classification. Once a group of entities has been identified, the host 32 may identify the entity who generates the most profits for that call classification. The call may then be assigned to that entity.

In considering profitability, a transaction processing system 10 may compare local rates of compensation against telephone toll charges and (if the profit is greater) transfer some or all of the calls to remotely located transaction processing systems 10. Where a remotely located agent/IVR provides a greater profit per call (subtracting toll and other average costs), the call may preferentially be assigned to the remotely located agent.

Further, where a highly profitable transaction processing system 10 is operating at capacity and additional calls are received by the system 10, the host 32 of that system 10 may overflow those calls to a less profitable system 10. Transferring the additional calls to a less profitable system 10 may be balanced against the lost profits of callers becoming frustrated and hanging up, resulting in a total profit loss for the call.

Assigning calls based upon profitability allows significant benefits in terms of overall system productivity and profitability. Further, the assignment of calls based on profitability allows incentive programs to be built around inherently productive agents in ways that would otherwise not be possible.

A specific embodiment of a method and apparatus for routing calls based upon profitability according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of processing calls in a transaction processing system using a plurality of transaction processing entities, such method comprising the steps of:
   - determining a profit generated by each transaction processing entity of the plurality of transaction processing entities for previously processed calls; and
   - assigning an transaction processing entity of the plurality of transaction processing entities with a highest relative profit to each new processed call.

2. The method of processing calls as in claim 1 further comprising determining a revenue per call.

3. The method of processing calls as in claim 2 further comprising determining a call handling time per call.

4. The method of processing calls as in claim 2 further comprising dividing the revenue per call by the call handling time to determine a revenue per time increment.

5. The method of processing calls as in claim 1 further comprising classifying a call based upon call associated information.

6. The method of processing calls as in claim 5 further comprising defining the call associated information as being one of a group including automatic number identification information, dialed number identification service information, Internet Protocol address, electronic serial number and e-mail address.

7. The method of processing calls as in claim 6 further comprising determining a minimum skill level for the new processed call.

8. The method of processing calls as in claim 7 further comprising correlating the call associated information with a content of a database to determine the minimum skill level.

9. The method of processing calls as in claim 8 wherein the step of correlating the call associated information with a content of a database to determine the minimum skill level further comprises using the call associated information to identify a file of an existing customer.

10. The method of processing calls as in claim 8 wherein the step of correlating the call associated information with a content of a database to determine the minimum skill level further comprises using the call associated information to identify an internal target of the new processed call.

11. The method of processing calls as in claim 7 further comprising sorting a plurality of agents to identify a subgroup of the transaction processing entities having a skill level exceeding the minimum skill level of the new processed call.

12. The method of processing calls as in claim 11 further comprising determining a toll rate to connect the new processed call to each of the plurality of agents.

13. The method of processing calls as in claim 12 further comprising subtracting the toll rate from the profit for each agent before assigning an agent to the call.

14. The method of processing calls as in claim 5 further comprising selecting an IVR application based upon the call classification.

15. The method of processing calls as in claim 14 further comprising connecting an interactive voice response unit to the new processed call.

16. The method of processing calls as in claim 15 further comprising executing the IVR application through the interactive voice response unit connected to the new processed call.

17. Apparatus for processing calls in a transaction processing system using a plurality of transaction processing entities, such apparatus comprising:
   means for determining an average profit generated by each transaction processing entity of the plurality of transaction processing entities for previously processed calls; and
   means for assigning a transaction processing entity of the plurality of transaction processing entities with a highest relative profit to each new processed call.

18. The apparatus for processing calls as in claim 17 further comprising means for determining an average revenue per call.

19. The apparatus for processing calls as in claim 18 further comprising means for determining an average call handling time per call.

20. The apparatus for processing calls as in claim 19 further comprising means for dividing the average revenue per call by the average call handling time to determine a revenue per time increment.

21. The apparatus for processing calls as in claim 17 further comprising means for classifying a call based upon call associated information.

22. The apparatus for processing calls as in claim 21 further comprising means for defining the call associated information as being one of a group including automatic number identification information, dialed number identification service information, Internet Protocol address, electronic serial number and e-mail address.

23. The apparatus for processing calls as in claim 22 further comprising means for determining a required skill level for the new processed call.

24. The apparatus for processing calls as in claim 23 further comprising means for correlating the call associated information with a content of a database to determine the required skill level.

25. The apparatus for processing calls as in claim 24 wherein the means for correlating the call associated information with a content of a database to determine the required skill level further comprises means for using the call associated information to identify an internal target of the new processed call.

26. The apparatus for processing calls as in claim 23 further comprising means for sorting a plurality of agents to identify a subgroup of transaction processing entities having a skill level exceeding the required skill level of the new processed call.

27. The apparatus for processing calls as in claim 26 further comprising means for determining a toll rate to connect the new processed call to each of the plurality of agents.

28. The apparatus for processing calls as in claim 27 further comprising means for subtracting the toll rate from the average profit for each agent before assigning an agent to the call.

29. Apparatus for processing calls in a transaction processing system using a plurality of agents, such apparatus comprising:
   a profit processor adapted to determine an average profit generated by each agent of the plurality of agents for previously processed calls; and
   an optimization processor adapted to assign an agent of the plurality of agents with a highest relative profit to each new processed call.

30. The apparatus for processing calls as in claim 29 further comprising a revenue processor adapted to determining an average revenue per call.

31. The apparatus for processing calls as in claim 30 further comprising a call timer adapted to determine an average call handling time per call.

32. The apparatus for processing calls as in claim 31 further comprising an average income processor adapted to divide the average revenue per call by the average call handling time to determine a revenue per time increment.

33. The apparatus for processing calls as in claim 29 further comprising a classification processor adapted to determine a call type based upon call associated information.

34. The apparatus for processing calls as in claim 33 wherein the call associated information further comprises one of a group including automatic number identification information, dialed number identification service information, Internet Protocol address and e-mail address.

35. The apparatus for processing calls as in claim 34 further comprising a skill processor adapted to determine a required skill level for the new processed call.

36. The apparatus for processing calls as in claim 35 further comprising a correlation processor adapted to correlate the call associated information with a content of a database to determine the required skill level.

37. The apparatus for processing calls as in claim 36 wherein the correlation processor further comprises a DNIS processor adapted to use the call associated information to identify an internal target of the new processed call.

38. The apparatus for processing calls as in claim 35 further comprising a sorting processor adapted to sort the plurality of agents to identify a subgroup having a skill level exceeding the required skill level of the new processed call.

39. The apparatus for processing calls as in claim 38 further comprising a toll processor adapted to determine a toll rate to connect the new processed call to each of the plurality of agents.

40. The apparatus for processing calls as in claim, 39 further comprising an arithmetic processor adapted to subtract the toll rate from the average profit for each agent before assigning an agent to the call.

* * * * *